(12) United States Patent
Watarai et al.

(10) Patent No.: US 10,017,224 B2
(45) Date of Patent: Jul. 10, 2018

(54) BICYCLE SHIFT OPERATING DEVICE

(75) Inventors: Etsuyoshi Watarai, Osaka (JP); Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 1604 days.

(21) Appl. No.: 11/970,586

(22) Filed: Jan. 8, 2008

(65) Prior Publication Data

US 2009/0173181 A1  Jul. 9, 2009

(51) Int. Cl.
*B62K 23/06* (2006.01)
*B62M 25/04* (2006.01)

(52) U.S. Cl.
CPC ............ *B62K 23/06* (2013.01); *B62M 25/04* (2013.01); *Y10T 74/20438* (2015.01)

(58) Field of Classification Search
CPC ........... F16C 1/10; B62M 25/00; B62M 25/04
USPC ............. 74/488, 489, 502.2, 473.14, 473.15
See application file for complete search history.

(56) References Cited

U.S. PATENT DOCUMENTS

| | | |
|---|---|---|
| 4,343,201 A | 8/1982 | Shimano |
| 4,532,825 A | 8/1985 | Nagano |
| 4,864,885 A | 9/1989 | Nagano |
| 5,012,692 A | 5/1991 | Nagano |
| 5,052,241 A | 10/1991 | Nagano |
| 5,186,072 A | 2/1993 | Nagano |
| 5,222,412 A | 6/1993 | Nagano |
| 5,241,878 A | 9/1993 | Nagano |
| 5,287,766 A | 2/1994 | Nagano |
| 5,325,735 A | 7/1994 | Nagano |
| 5,400,675 A | 3/1995 | Nagano |
| 5,676,022 A | 10/1997 | Ose |
| 6,095,010 A * | 8/2000 | Arbeiter ................. B62K 23/06 74/473.14 |
| 6,647,823 B2 | 11/2003 | Tsumiyama et al. |

(Continued)

FOREIGN PATENT DOCUMENTS

| | | |
|---|---|---|
| EP | 1024079 A2 | 8/2000 |
| EP | 1 535 829 A2 | 6/2005 |
| WO | WO-2005/044656 A1 | 5/2005 |

OTHER PUBLICATIONS

"Shimano Bicycle System Components" Catalog; Shimano Industrial Co., Ltd.; "Shimano-DX Shifting Lever", Apr. 1982, p. 124.

(Continued)

*Primary Examiner* — Daniel D Yabut
(74) *Attorney, Agent, or Firm* — Global IP Counselors, LLP

(57) ABSTRACT

A bicycle shift operating device basically has a base member, a shift wire take-up element rotatably mounted with respect to the base member and a shifting unit operatively coupled to the shift wire take-up element to selectively rotate the shift wire take-up element in first and second rotational directions about a pivot axis. The shifting unit includes a shift operating member pivotally mounted with respect to the base member along a pivotal path to operate the shift wire take-up element in the first rotational direction in response to pivotal movement of the shift operating member about an operating axis. The shift operating member is movably mounted with respect to the base member along a non-pivotal path to operate the shift wire take-up element in the second rotational direction in response to non-pivotal movement of the shift operating member with respect to the operating axis.

14 Claims, 11 Drawing Sheets

(56) References Cited

U.S. PATENT DOCUMENTS

| | | |
|---|---|---|
| 7,194,928 B2 | 3/2007 | Kawakami |
| 2005/0204854 A1 | 9/2005 | Mclaughlin et al. |
| 2006/0070478 A1 | 4/2006 | Kawakami |
| 2006/0070479 A1 | 4/2006 | Ose |
| 2006/0272443 A1 | 12/2006 | Tsumiyama |
| 2007/0137385 A1* | 6/2007 | Cesur .................. B62K 23/06 74/501.6 |

OTHER PUBLICATIONS

"BMX Racing Components" Brochure from JBM; "Shimano-DX Shifting Lever", Feb. 1980.
"Fahrradtechnik (Bicycle Technology)" Winkler et al.; Edition 9, Published 1993, pp. 271 to 295, ISBN 3-87073-131-1.

* cited by examiner

BICYCLE SHIFT OPERATING DEVICE

BACKGROUND OF THE INVENTION

Field of the Invention

This invention generally relates to a bicycle shift operating device. More specifically, the present invention relates to a bicycle shift operating device that includes a shifting unit with a single shift operating member that can be used for both winding and releasing a control wire.

Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One part of the bicycle that has been extensively redesigned is the bicycle transmission. Specifically, a bicycle transmission typically includes front and rear shift operating devices designed to operate front and rear derailleurs to move the derailleurs laterally over a plurality of sprockets. The sprockets are usually coupled to the front crank and the rear wheel such that a pedaling force from the ride is transferred to the rear wheel via the chain.

In the past, shift operating devices have been utilized that include one or more levers that are pivoted to wind and release an inner wire of a control cable. Alternatively, rotating hand grips have also been utilized to wind and release the inner wire of the control cable. The wires are coupled to the front and rear derailleurs to shift the chain over the various sprockets. Some of these prior shift operating devices can be complicated and expensive to manufacture and assemble. Furthermore, some of these prior shifting devices are sometimes heavy and/or cumbersome.

In view of the above, there exists a need for a bicycle shift operating device which overcomes the above mentioned problems in the prior art. This invention addresses this need in the art as well as other needs, which will become apparent to those skilled in the art from this disclosure.

SUMMARY OF THE INVENTION

One object of the present invention is to provide a bicycle shift operating device that includes a single shift operating member that can be used for both winding and releasing a control wire with one of the shifting operations being accomplished with a pivotal movement of the shift operating member.

Another object of the present invention is to provide a bicycle shift operating device that is relatively simple and inexpensive to manufacture and assemble.

The foregoing objects can basically be attained by providing a bicycle shift operating device that basically includes a base member, a shift wire take-up element and a shifting unit. The shift wire take-up element is rotatably mounted with respect to the base member in first and second rotational directions about a pivot axis. The shifting unit is operatively coupled to the shift wire take-up element. The shifting unit includes a shift operating member movably mounted with respect to the base member to move along a first plane to operate the shift wire take-up element in the first rotational direction, and to move along a second plane to operate the shift wire take-up element in the second rotational direction, with the first and second planes intersecting by an angle between twenty degrees and seventy degrees.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
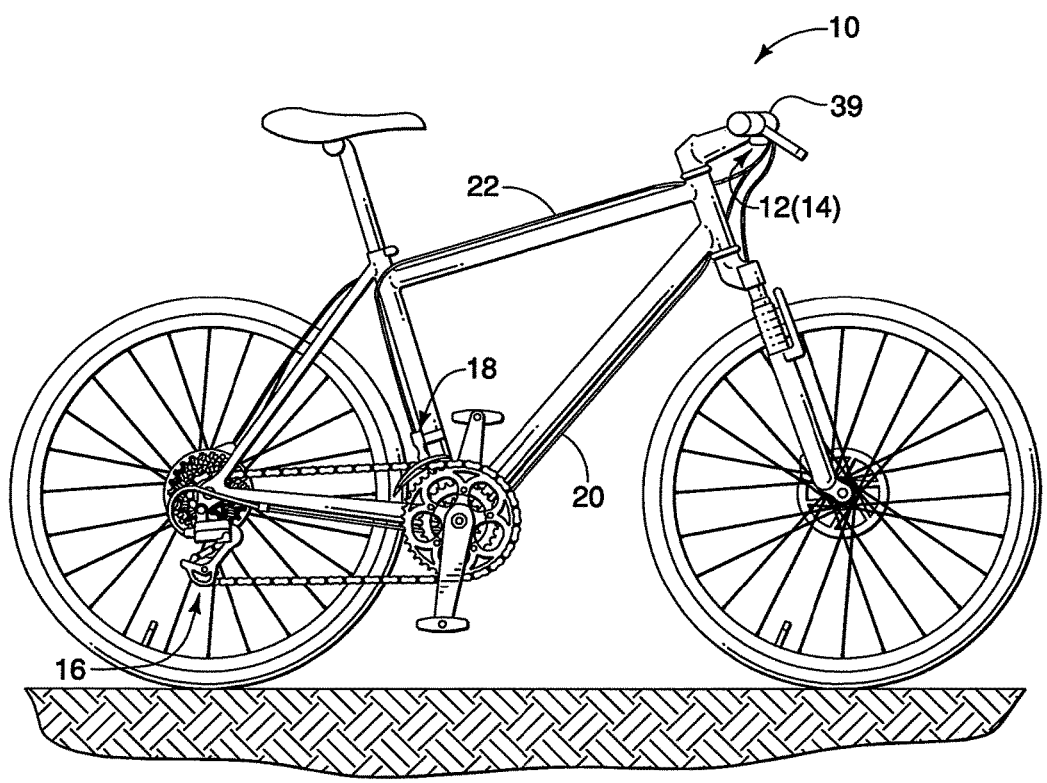
FIG. 1 is a side elevational view of a bicycle with a pair of shift operating devices coupled thereto in accordance with one embodiment.
Figure 2:
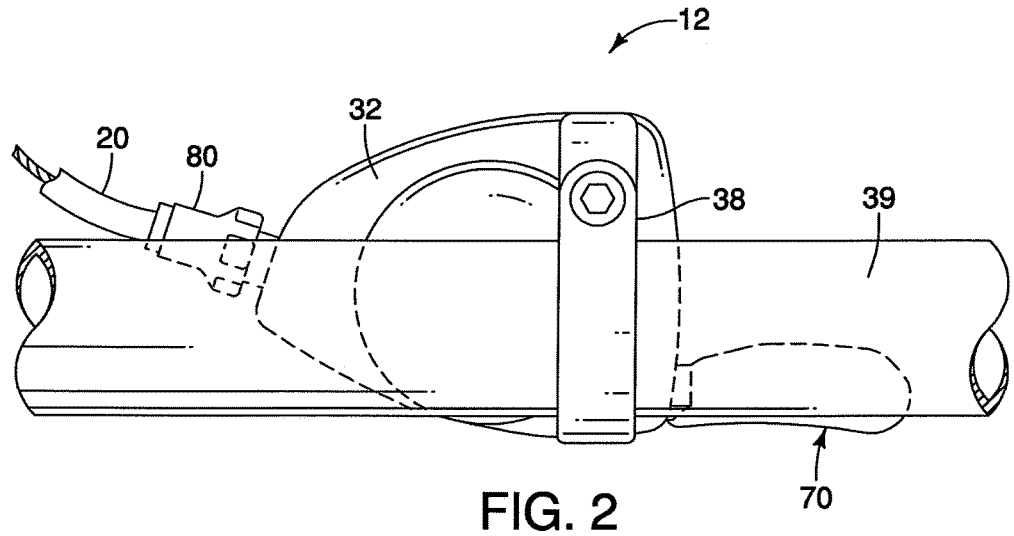
FIG. 2 is an enlarged top plan view of the right shift operating device in accordance with the illustrated embodiment, with the shift operating member of the right shift operating device in a rest position.
Figure 3:
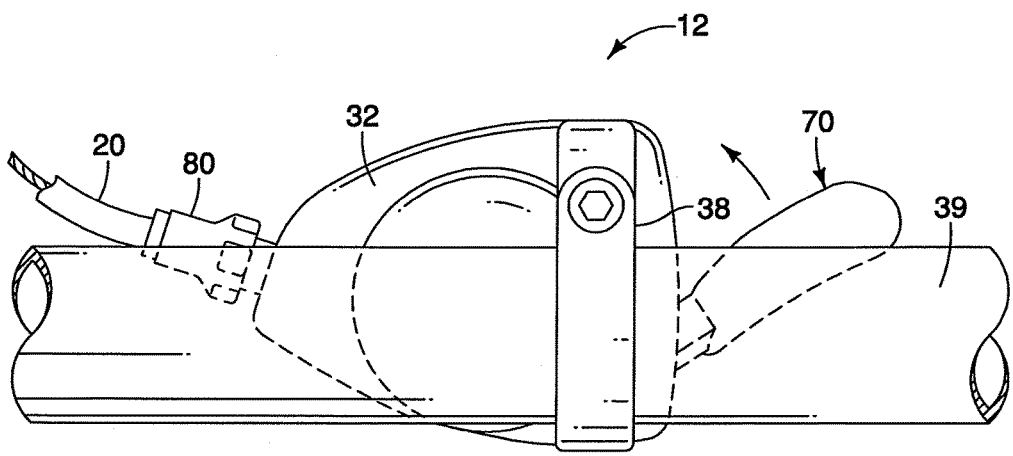
FIG. 3 is an enlarged top plan view of the right shift operating device illustrated in FIG. 2 in accordance with the illustrated embodiment, with the shift operating member rotated to perform a first shifting (wire winding) operation.

Referring initially to FIG. 1, a bicycle 10 is illustrated that is equipped with a pair of bicycle shift operating devices 12 and 14 in accordance with a first embodiment. The bicycle shift operating device 12 is a right hand side control device operated by the rider's right hand to operate a rear derailleur 16, while the bicycle shift operating device 14 is a left hand side control device operated by the rider's left hand to operate a front derailleur 18. In the illustrated embodiment, the bicycle shift operating device 12 is operatively coupled to the rear derailleur 16 via a shift control cable 20. The bicycle shift operating device 14 is operatively coupled to the front derailleur 18 via a shift control cable 22. Preferably, the shift control cables 20 and 22 are conventional bicycle control cables that have an outer casing the covers an inner wire. In other words, each of the shift control cables 20 and 22 basically includes an inner wire slidably received within an outer casing. Alternatively, the bicycle control devices 12 and 14 can be switched so that the rider can operate the rear and front derailleurs 16 and 18 with opposite hands as needed and/or desired.

In the illustrated embodiment, the right and left hand bicycle shift operating devices 12 and 14 are essentially identical in operation, except that they are mirror images of each other and the number of shift positions are different. In other words, the left hand side shift operating device 14 is substantially identical to the right hand side shift operating device 12, except for the shifting unit (not shown) of the left hand side shift operating device 14 has been modified to be a mirror image and to decrease the number of gears that can be shifted. Thus, only the right hand side bicycle control device 12 will be discussed and illustrated herein.

Figure 4:
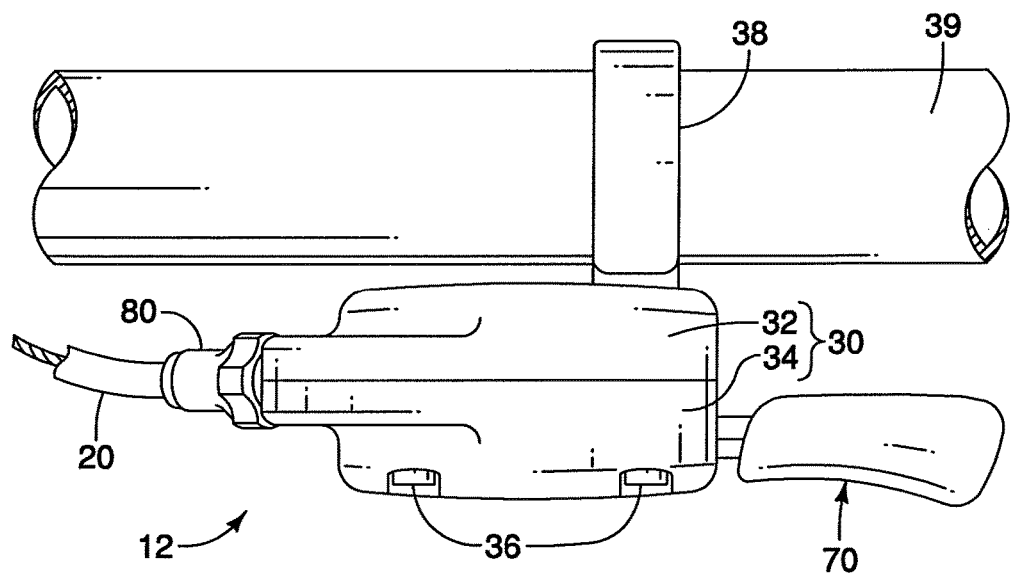
FIG. 4 is a rear elevational view of the right shift operating device illustrated in FIGS. 2 and 3 in accordance with the first embodiment, with the shift operating member in the rest position.
Figure 5:
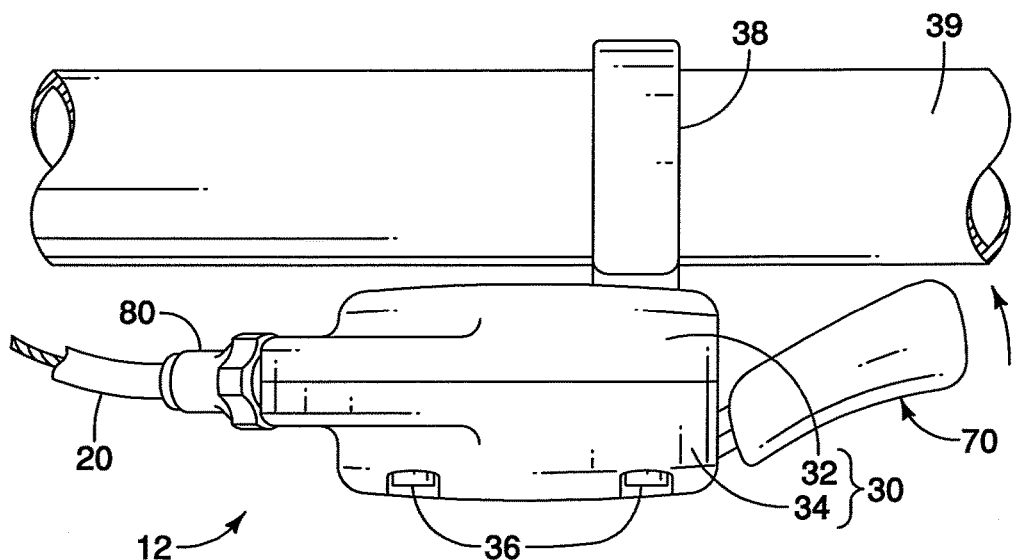
FIG. 5 is a rear elevational view of the right shift operating device illustrated in FIGS. 2 to 4 in accordance with the illustrated embodiment, with the shift operating member rotated to perform a second shifting (wire releasing) operation.

As seen in FIGS. 4 and 5, the bicycle shift operating device 12 has a housing 30 with an upper cover 32 and a lower cover 34 that are coupled together by a plurality of screws 36 (only two shown in the Figures). The upper and lower covers 32 and 34 are constructed of a hard rigid material such as a hard plastic or a metallic material.

Figure 6:
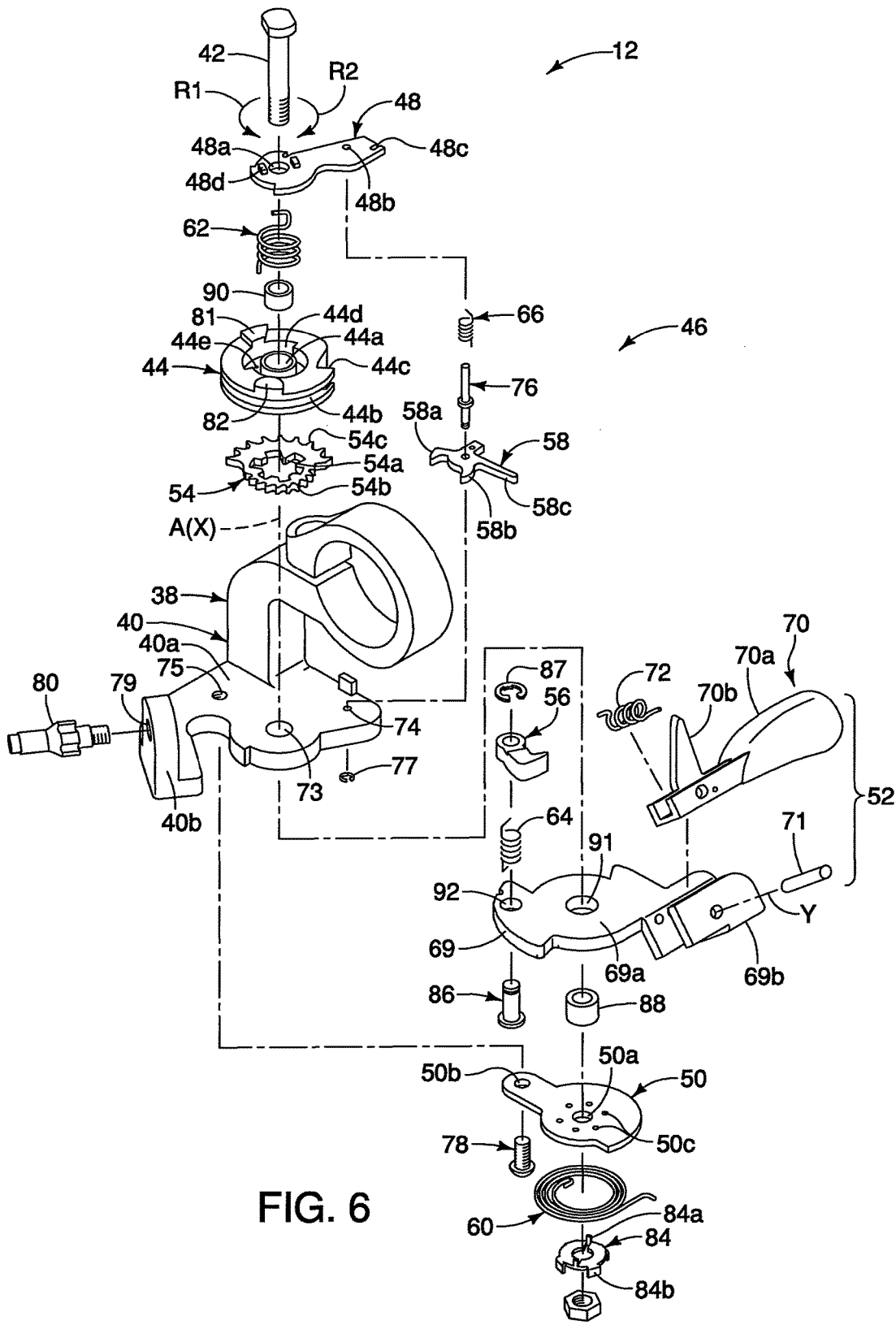
FIG. 6 is an exploded perspective view of selected parts of the right shift operating device illustrated in FIGS. 2 to 5 in accordance with the illustrated embodiment.

As seen in FIG. 6, inside of the housing 30 is a bicycle shifting mechanism is provided that basically includes a bicycle handlebar clamping member 38, a base member 40, a shift unit axle 42, a shift wire take-up element 44 and a shifting unit 46. The bicycle handlebar clamping member 38 is a conventional tube clamp that is configured to mount the bicycle shift operating device 12 on a bicycle handlebar 39 in a conventional manner. The bicycle handlebar 39 has a handlebar mounting axis H. The clamping member 38 can be integrally formed with the base member 40, as illustrated, or can be a separate member that is attached to either the base member 40 or the housing 30 by a fastener, as needed and/or desired.

The shift unit axle 42 defines a main pivot axis A of the shift wire take-up element 44 and the shifting unit 46. The shifting unit 46 is operatively coupled to the shift wire take-up element 44 to selectively rotate the shift wire take-up element 44 in the first and second rotational directions R1 and R2 as explained below. The shift wire take-up element 44 and the shifting unit 46 are attached to the base member 40 by the shift unit axle 42 in conjunction with a first retaining plate 48 and a second retaining plate 50.

Figure 11:
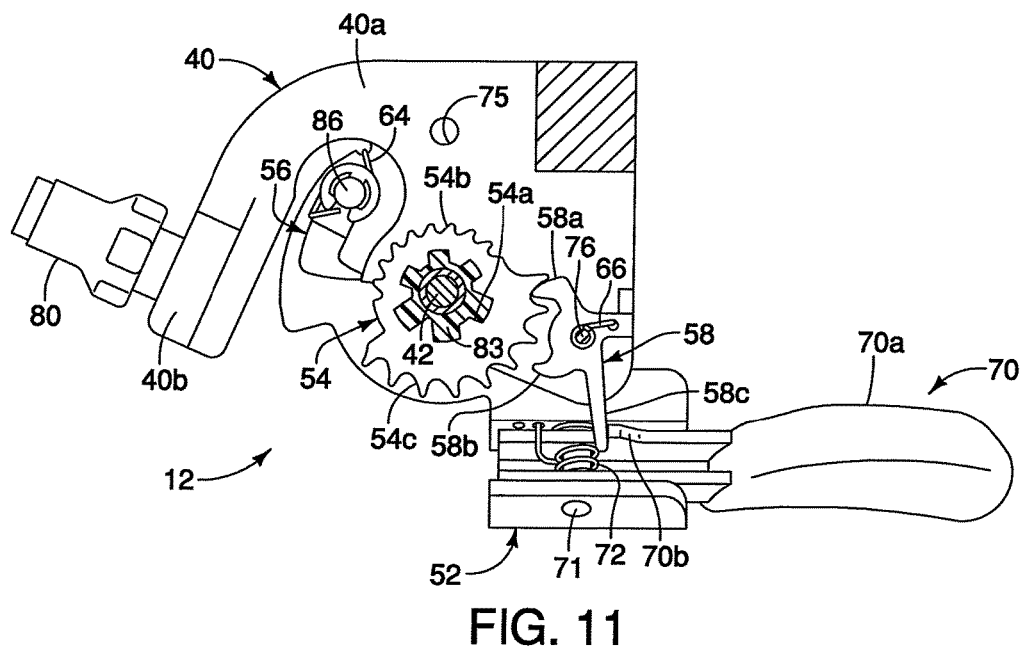
FIG. 11 is a cross sectional view of the right shift operating device illustrating selected parts of the right shift operating device illustrated in FIGS. 2 to 10 to illustrated the shifting unit in the fully released position.
Figure 12:
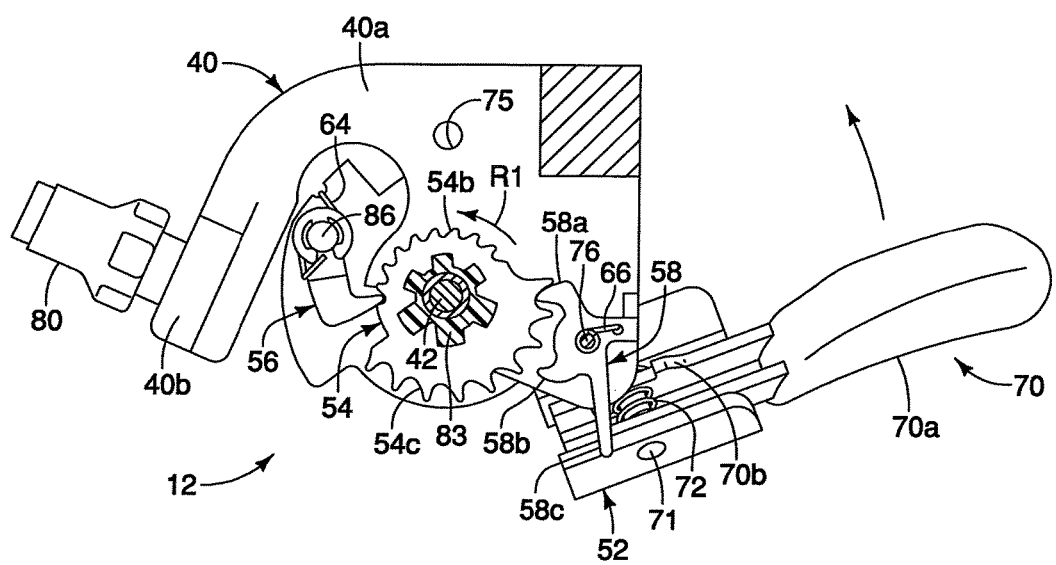
FIG. 12 is a cross sectional view, similar to FIG. 11, of the right shift operating device, but with the shift operating member being initially moved so that the winding pawl engages one of the wire winding teeth to perform a shifting operation, i.e., a wire winding operation.
Figures 13, 14:
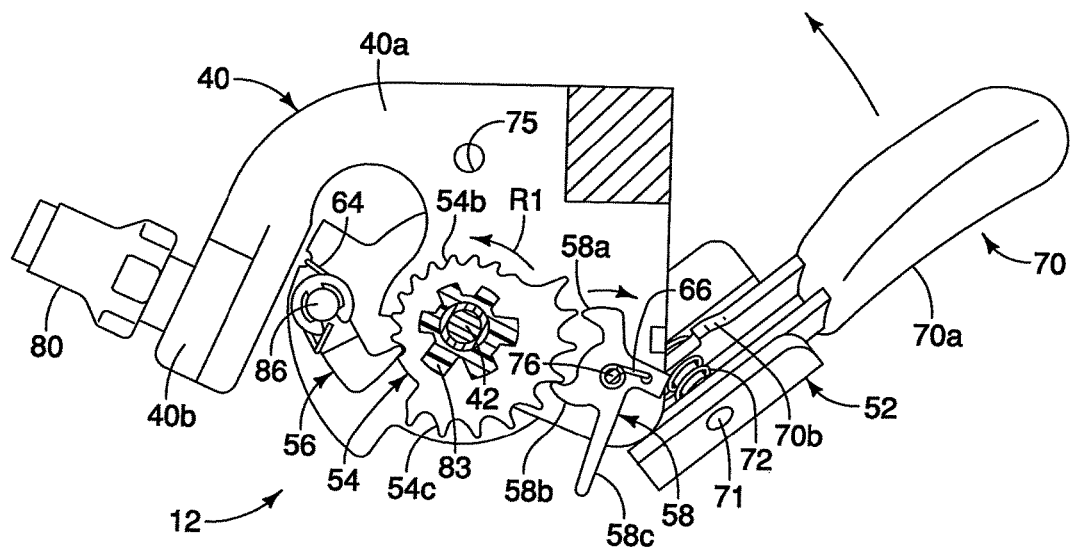
FIG. 13 is a cross sectional view, similar to FIGS. 11 and 12, of the right shift operating device, but with the shift operating member rotating the ratchet member in the first rotational direction to perform the shifting operation, i.e., the wire winding operation.
FIG. 14 is a bottom plan view of the right shift operating device as illustrated in FIG. 13, with the shift operating member rotating the ratchet member in the first rotational direction to perform the shifting operation, i.e., the wire winding operation.
Figure 15:
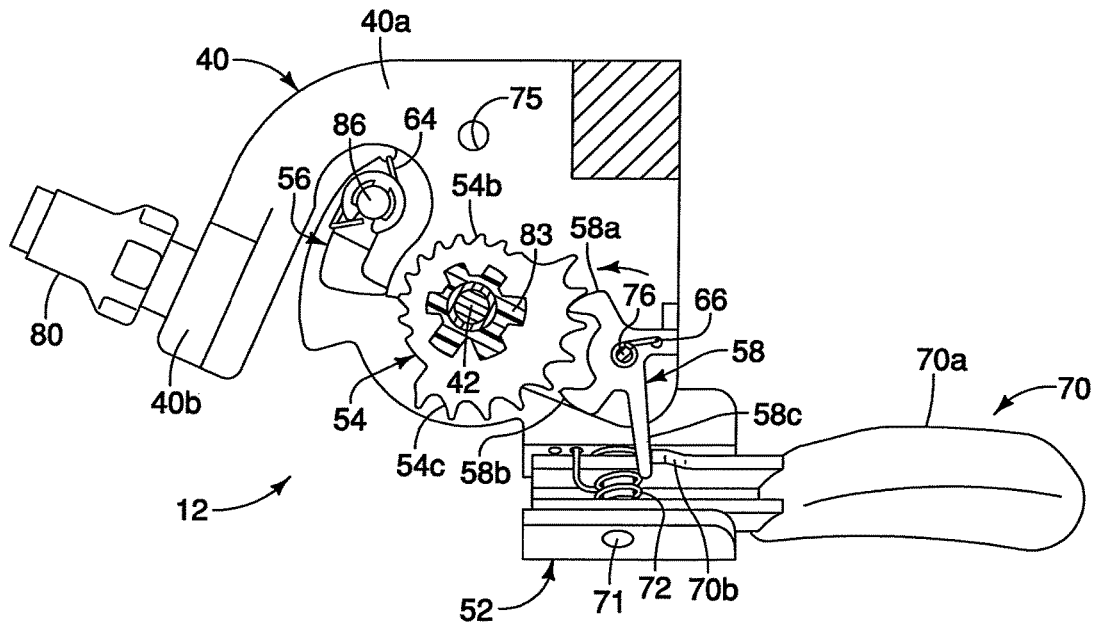
FIG. 15 is a cross sectional view, similar to FIGS. 11 to 13, of the right shift operating device, but with the shift operating member returned to the rest position after performing the shifting operation, i.e., the wire releasing operation.
Figure 16:
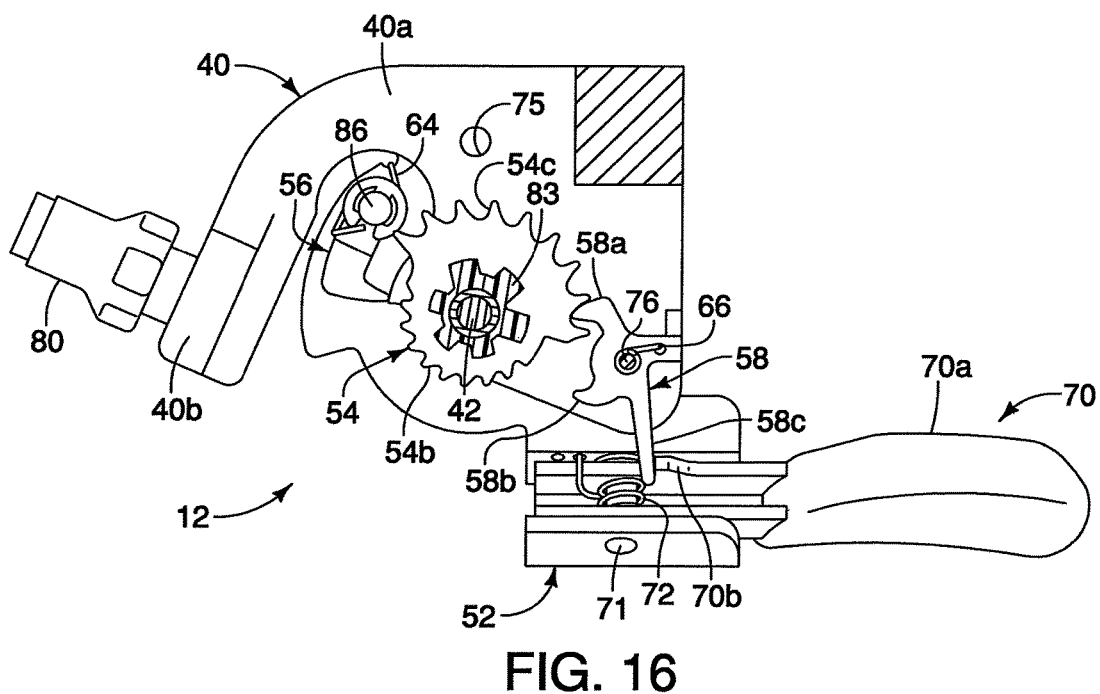
FIG. 16 is a cross sectional view of the right shift operating device illustrating selected parts of the right shift operating device illustrated in FIGS. 2 to 15 to illustrated the shifting unit in the fully released position.
Figure 17:
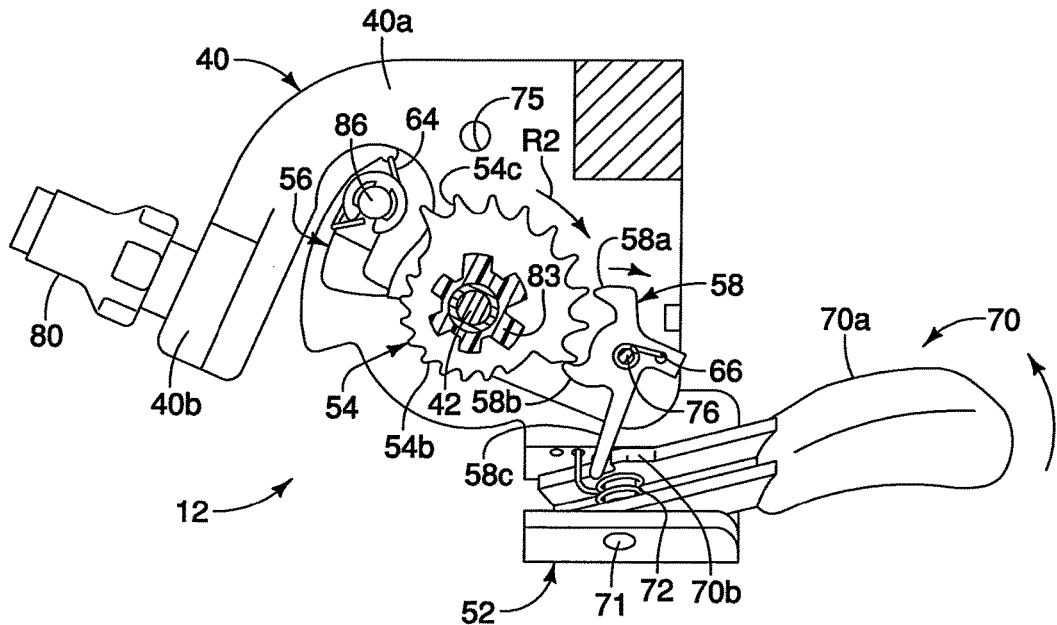
FIG. 17 is a cross sectional view, similar to FIG. 16, of the right shift operating device, but with the shift operating member moved to a shifting position to perform a shifting operation, i.e., a wire releasing operation.

As seen in FIG. 6, the shifting unit 46 basically includes a shift operating member 52, a ratchet member 54, a winding pawl 56, and a release pawl 58. The shifting unit 46 further includes a lever biasing element or return spring 60, a main biasing element or spring 62, a winding pawl spring 64 and a release pawl spring 66. The main spring 62 is configured and arranged for urging both the shift wire take-up element 44 and the ratchet member 54 in a wire releasing direction. The winding pawl spring 64 is configured and arranged for urging the winding pawl 56 into engagement with the ratchet member 54 after the shift operating member 52 is moved in the first rotational direction R1 from a rest position to perform a shifting operation as seen in FIG. 12. The release pawl spring 66 is configured and arranged for urging the release pawl 58 into engagement with the ratchet member 54 when the shift operating member 52 is in a rest position as seen in FIGS. 11 and 12. Thus, the shifting unit 46 is operatively coupled to the shift wire take-up element 44 to control the position of the shift wire take-up element 44 in response to movement of the shift operating member 52.

The shift operating member 52 is a shift lever that is movably mounted with respect to the base member 40 to performs both wire winding and wire releasing operation of the shift wire take-up element 44. The shift operating member 52 is a trigger action member or lever that is biased to a single prescribed rest position after performing a shifting operation (either a wire winding operation or a wire releasing operation). In particular, the return spring 60 biases the shift operating member 52 to a rest position with respect to the base member 40. The shift operating member 52 also has a support member 69 pivotally mounted on the shift unit axle 42, a lever member 70 pivotally mounted on the support member 69 by a pivot pin 71 and a biasing element or spring 72 urging the lever member 70 to a rest position with respect to the support member 69. Thus, the lever member 70 of the shift operating member 52 is also a trigger action lever that is biased to a single prescribed rest position after performing a shifting operation (e.g., a wire releasing operation).

The shift operating member 52 is pivotally mounted about the pivot axis A of the shift wire take-yip element 44 to operate the shift wire take-up element 44 in the first rotational direction R1 in response to movement of the lever member 70 of the shift operating member 52 in a first plane P1 from a rest position to a first operated position. The lever member 70 of the shift operating member 52 is pivotally mounted about an operating axis Y to operate the shift wire take-up element 44 in the second rotational direction R2 in response to movement of the lever member 70 of the shift operating member 52 in a second plane P2 from the rest position to a second operated position. The first plane P1 is perpendicular to a primary operating axis X (coincident with the pivot axis A), while the second plane P2 perpendicular to a secondary operating axis Y defined by the pivot pin 71. Thus, rotating the lever member 70 about the primary operating axis X of the shift unit axle 42 performs a wire winding operation, while rotating the lever member 70 about the secondary operating axis Y of the pivot pin 71 performs a wire releasing operation.

Figure 10:
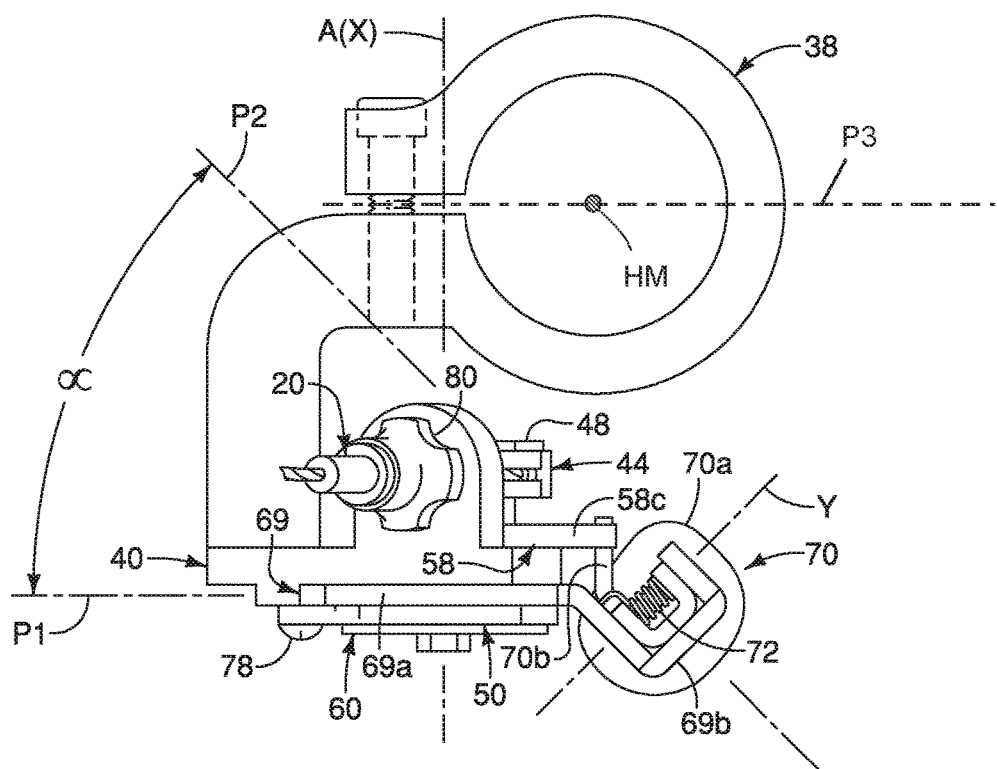
FIG. 10 is a side elevational view of the right shift operating device illustrated in FIGS. 2 to 9, but with the covers removed to illustrated the shifting unit.

In the illustrated embodiment, as best seen in FIG. 10, the first plane P1 forms an acute angle α with the second plane P2. Preferably, the angle α between the first and second planes P1 and P2 lies in a range between twenty degrees and seventy degrees. More preferably, the angle α is about forty-five degrees. In the illustrated embodiment, the angle α is forty-five degrees. Thus, the operating axis Y of the lever member 70 forms a forty-five degree angle with the operating axis X of the lever member 70. Since the lever member 70 pivots about the operating axes X and Y, the lever member 70 move along the first plane P1 to operate the shift wire take-up element 44 in the first rotational direction R1 and move along the second plane P2 to operate the shift wire take-up element 44 in the second rotational direction R2. Moreover, a third plane P3 extends parallel to the first plane, and includes the handlebar mounting axis HM. Thus, as is understood, the second plane P2 intersects the pivot axis A only between the first plane P1 the third plane P3 parallel to the first plane P1 and including a handlebar mounting axis HM.

Figure 8:
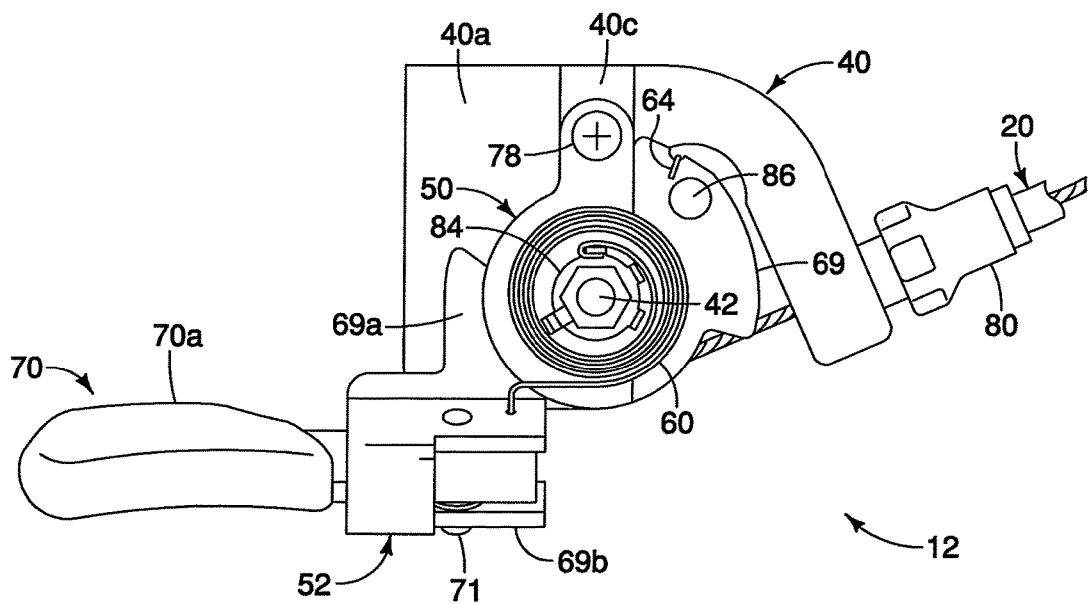
FIG. 8 is a bottom plan view of the right shift operating device illustrated in FIGS. 2 to 7, but with the covers removed to illustrated the shifting unit in a fully released (unwound) position.

As seen in FIG. 6, the base member 40 is preferably constructed of a hard rigid material such a metallic material. The base member 40 is the main support for the shift wire take-up element 44 and the shifting unit 46. Preferably, the base member 40 is constructed of a lightweight rigid material such as cast aluminum or deformed sheet metal. The base member 40 is located between the first retaining plate 48 and the second retaining plate 50. The base member 40 basically has a base portion 40a, a cable attachment flange 40b projecting upwardly from the upper side of the base portion 40a and a stop 40c (FIG. 8) projecting downwardly from the lower side of the base portion 40a.

As seen in FIG. 6, the base portion 40a of the base member 40 has a main axle hole 73, a release pawl supporting hole 74 and a threaded screw hole 75. The main axle hole 73 receives the shift unit axle 42 therethrough for operatively mounting the shift wire take-up element 44 on the upper side and for operatively mounting the shift operating member 52 on the lower side. The release pawl supporting hole 74 has a pivot pin 76 retained therein by a clip 77. The pivot pin 76 pivotally supports the release pawl 58. The threaded screw hole 75 threadedly receives a bolt 78 for fixing the second retaining plate 50 to the lower surface of the base member 40. The cable attachment flange 40b of the base member 40 has a threaded screw hole 79 for threadedly receiving a cable adjusting nut 80. The cable adjusting nut 80 receives the shift control cable 20. The stop 40c limits rotational movement of the shift operating member 52 about the shift unit axle 42. The threaded screw hole 75 extends through the stop 40c so that the second retaining plate 50 is spaced by a prescribed distance from the lower surface of the base member 40 to accommodate the shift operating member 52 between the second retaining plate 50 and the lower surface of the base member 40.

The winding pawl spring 64 is located on the lower side of the base portion 40a of the base member 40. The winding pawl spring 64 is pivotally supported on the shift operating member 52 by a pivot pin 86 that is retained on the shift operating member 52 by a clip 87 as seen in FIG. 6. The winding pawl spring 64 urges the winding pawl 56 into engagement with an abutment of the base portion 40a of the base member 40 when the shift operating member 52 is in a rest position as seen in FIG. 11.

In the illustrated embodiment, the shift unit axle 42 is formed by a bolt and a nut. The shift unit axle 42 rotatably supports the shift wire take-up element 44 on the upper side of the base member 40. In particular, the shift wire take-up element 44 is rotatably mounted with respect to the base member 40 in the first and second rotational directions R1 and R2 about the main pivot axis A. The shift unit axle 42 also pivotally supports the shift operating member 52 on the lower side of the base member 40 about the operating axis X. Thus, the shift unit axle 42 defines the main pivot axis A of the shift wire take-up element 44 and the operating axis X of the shift operating member 52. In other words, in the illustrated embodiment, the operating axis X of the shift operating member 52 is coincident with the pivot axis A of the shift wire take-up element 44.

The shift wire take-up element 44 is preferably a wire winding member that is integrally formed as a one-piece unitary member. Moreover, the shift wire take-up element 44 is preferably constructed of a lightweight rigid material such as hard plastic. The shift wire take-up element 44 basically has a central bore 44a, an inner wire receiving groove 44b and an inner wire nipple receiving recess 44c. The central bore 44a receives the shift unit axle 42 for rotatably supporting the shift wire take-up element 44. A tubular spacer 90 is disposed in the central bore 44a of the shift wire take-up element 44. The tubular spacer 90 is preferably a tubular member constructed of lightweight rigid material with one end contacting the lower surface of the first retaining plate 48 and the other end contacting n the upper surface of the base member 40. The tubular spacer 90 maintains the appropriate spacing between the base member 40 and the first retaining plate 48 so that the shift wire take-up element 44 can freely rotate on the shift unit axle 42, i.e., so that the shift unit axle 42 does not apply an axial force on the shift wire take-up element 44. The inner wire nipple receiving recess 44c forms an attachment point for the shift control cable 20. As seen in FIG. 6, the upper surface of the shift wire take-up element 44 has an annular recess 44d for receiving a coiled portion of the main spring 62. A hole 44e is provided in the annular recess 44d for attaching one end of the main spring 62 thereto. In particular, the main spring 62 is preferably a metal torsion spring that is arranged to apply an urging force on the shift wire take-up element 44 and the ratchet member 54 to rotate about the shift unit axle 42 in the second rotational direction R2. The main spring 62 basically includes a first end engaged with a notch in the first retaining plate 48 (FIG. 7), a second end engaged with the shift wire take-up element 44 and a coiled portion located on the shift axle 42. The main spring 62 urges the shift wire take-up element 44 about the pivot axis A in the second rotational direction R2 so that the shift wire take-up element 44 automatically rotates in the wire releasing direction when a releasing operation is performed by pushing the shift operating member 52 towards the operating axis X.

Figure 7:
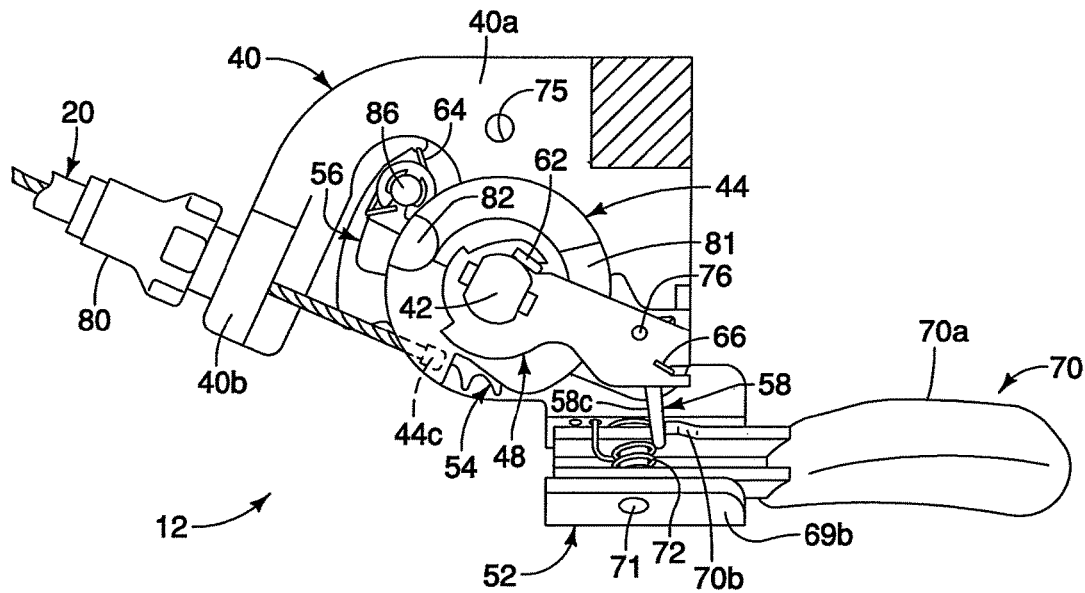
FIG. 7 is a top plan view of the right shift operating device illustrated in FIGS. 2 to 6, but with the covers removed to illustrated the shifting unit in a fully released (unwound) position.
Figure 9:
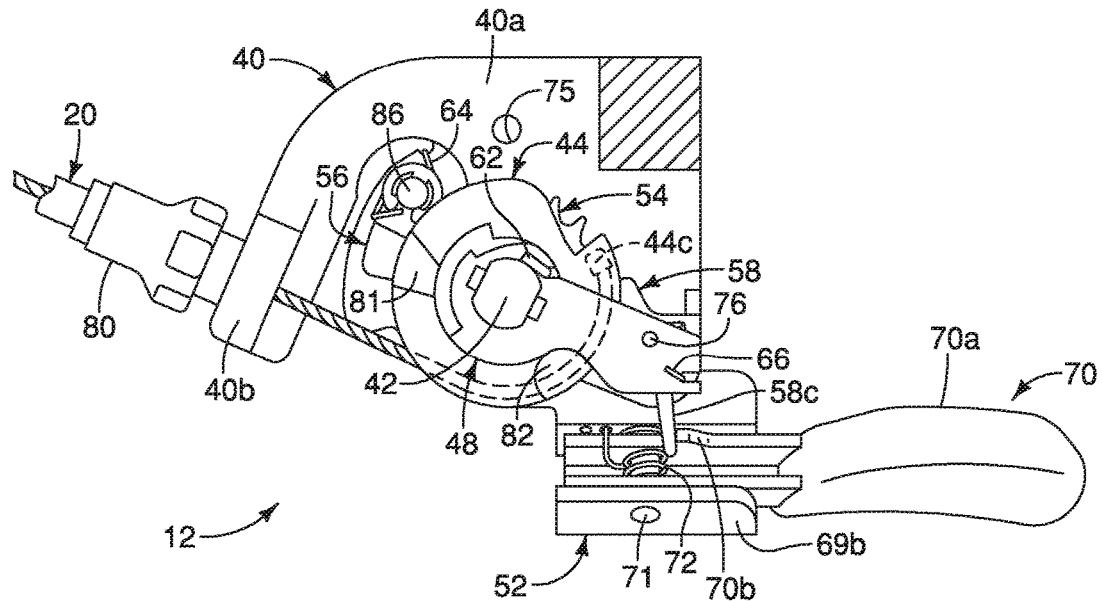
FIG. 9 is a top plan view of the right shift operating device illustrated in FIGS. 2 to 8, but with the covers removed to illustrated the shifting unit in a fully wound position.

As seen in FIGS. 7 and 9, the upper surface of the shift wire take-up element 44 has a first projection 81 and a second projection 82. These projections 81 and 82 act as end stops for the rotational movement of the shift wire take-up element 44. In particular, the first projection 81 will contact the first retaining plate 48 when the shift wire take-up element 44 is in a fully unwound position as seen in FIG. 7. On the other hand, the second projection 82 contacts the first retaining plate 48 when the shift wire take-up element 44 is in a fully wound position as seen in FIG. 9.

As best seen in FIGS. 11 to 19, the lower surface of the shift wire take-up element 44 has a non-circular projection 83 surrounding the central bore 44a. The non-circular projection 83 engages the ratchet member 54 to non-rotatably coupled to the ratchet member 54 to the shift wire take-up element 44. Thus, the ratchet member 54 rotates with the shift wire take-up element 44 as a unit. As explained below, the rotational movement of the shift wire take-up element 44 is controlled by the shifting unit 46.

As seen in FIG. 6, the first retaining plate 48 is preferably a plate member constructed of a hard rigid material such as a metallic material. The first retaining plate 48 has a first hole 48a for receiving the shift unit axle 42 and a second hole 48b for receiving the pivot pin 76 that pivotally supports the release pawl 58. A notch 48c is provided for receiving one end of the release pawl spring 66. Optionally, the upper surface of the first retaining plate 48 has a pair of projections 48d for engaging a head portion of the shift unit axle 42.

The second retaining plate 50 is preferably a plate member constructed of a hard rigid material such as a metallic material. The second retaining plate 50 has a first hole 50a for receiving the shift unit axle 42 and a second hole 50b for receiving the bolt 78 to fix the second retaining plate 50 to the lower side of the base member 40. The second retaining plate 50 also has a plurality of small retaining bores 50c located in a circular pattern about the first hole 50a. These small retaining bores 50c are configured to receive a pair of projections 84a of a nut plate 84 to selectively hold the nut plate 84 in one of a plurality of predetermined orientations, which depending upon which of the small retaining bores 50c receives the projections 84a of the nut plate 84. The nut plate 84 has four flanges 84b that project away from the second retaining plate 50 such that one of the flanges 84b receives one end of the return spring 60.

The shift operating member 52 is a trigger action lever that is biased to a single prescribed rest position by the return spring 60 after performing a shifting operation (i.e., either a wire winding operation or a wire releasing operation). The return spring 60 is preferably a spiral torsion spring with one end coupled to the shift operating member 52 and a second end coupled to the base member 40 (i.e., via the nut plate 84 and the second retaining plate 50 that is fixed to the base member 40 by bolt 78).

The support member 69 of the shift operating member 52 preferably includes a plate portion 69a and a bracket portion 69b. The plate portion 69a and the bracket portion 69b are preferably constructed as a one piece, unitary member from a hard rigid material such as a metallic material. The plate portion 69a has a main mounting hole 91 and a winding pawl supporting hole 92. The main mounting hole 91 receives the shift unit axle 42 therethrough for operatively mounting the shift operating member 52 thereto. Thus, the shift operating member 52 is pivotally mounted with respect to the base member 40 by the shift unit axle 42. The winding pawl supporting hole 92 has the pivot pin 86 retained therein by the clip 87 as seen in FIG. 6. The pivot pin 86 pivotally supports the winding pawl 56 on the shift operating member 52. The bracket portion 69b is a U-shaped member that pivotally supports the lever member 70.

A tubular spacer 88 is disposed in the main mounting opening 91 of the shift operating member 52. The tubular spacer 88 is preferably a tubular member constructed of lightweight rigid material with one end contacting the lower surface of the base member 40 and the other end contacting upper surface of the second retaining plate 50. The tubular spacer 88 maintains the appropriate spacing between the base member 40 and the second retaining plate 50 so that the shift operating member 52 can be freely moved on the shift unit axle 42, i.e., so that the shift unit axle 42 does not apply an axial force on the shift operating member 52.

The support member 69 and the lever member 70 are urged to a rest position by the return spring 60. The plate portion 69a of the support member 69 forms the first plane P1. Thus, the shift operating member 52 can freely move along the first plane P1 to operate the shift wire take-up element 44 in the first rotational direction R1 in response to pivotal movement of the shift operating member 52 about the operating axis X. The lever member 70 is pivotally mounted on the bracket portion 69b of the support member 69 by the pivot pin 71. The spring 72 urges the lever member 70 to a rest position with respect to the support member 69. The lever member 70 has an external rider operating portion 70a and an internal pawl engagement projection 70b. The internal pawl engagement projection 70b is configured and arranged to engage the release pawl 58 so that the release pawl 58 is moved to release the ratchet member 54 as discussed below.

The ratchet member 54 is preferably a thin flat plate member. Preferably, the ratchet member 54 is constructed of a lightweight rigid material such as sheet metal. The ratchet member 54 basically includes a splined central opening 54a, a plurality of winding teeth 54b and a plurality of positioning teeth 54c. As seen FIGS. 11 to 19, the opening 54a is configured to receive the non-circular projection 83 of the shift wire take-up element 44 to non-rotatably couple the ratchet member 54 to the shift wire take-up element 44 in a predetermined orientation. Thus, the ratchet member 54 is mounted to rotate with the shift wire take-up element 44 in response to the pivotal and non-pivotal movements of the shift operating member 52.

The winding teeth 54b are selectively engaged by the winding pawl 56 to rotate the shift wire take-up element 44 in the first rotational direction R1 in response to the pivotal movement of the shift operating member 52 about the operating axis X. The positioning teeth 54c are selectively engaged by the release pawl 58 to selectively hold and retain the ratchet member 54 and the shift wire take-up element 44 in one of the plurality of shift positions.

The winding pawl 56 is biased to engage the abutment of the base member 40 when the shift operating member 52 is in a rest position as seen in FIG. 11. In particular, the winding pawl spring 64 is preferably a metal torsion spring that is arranged to apply an urging force on the winding pawl 56 such that the winding pawl 56 is normally biased to engage one of the winding teeth 54b when the shift operating member 52 moves the winding pawl 56 off of the abutment of the base member 40. Thus, the winding pawl 56 is operatively coupled to the shift operating member 52 to selectively engage one of the winding teeth 54b of the ratchet member 54 to rotate the shift wire take-up element 44 in the first rotational direction R1 in response to the shift operating member 52 being moved along the first plane P1 from the rest position.

The release pawl 58 is operatively coupled to the shift operating member 52 to selectively engage one of the positioning teeth 54c of the ratchet member 54 to release the shift wire take-up element 44 in the second rotational direction in response to the shift operating member 52 being moved along the second plane P2. The release pawl 58 is biased to engage one of the positioning teeth 54c when the shift operating member 52 is in a rest position. In particular, the release pawl spring 66 is preferably a metal torsion spring that is arranged to apply an urging force on the release pawl 58 such that the release pawl 58 is normally biased to engage one of the positioning teeth 54c of the ratchet member 54 when the shift operating member 52 is in a rest position.

As seen in FIGS. 11 to 19, the release pawl 58 is pivotally mounted on the pivot pin 76 and basically includes a first stop tooth 58a, a second stop tooth 58b and an actuating projection 58c. The first and second stop teeth 58a and 58b are arranged to engage one of the positioning teeth 54c. In particular, as seen in FIGS. 16 to 19, when the lever member 70 of the shift operating member 52 is rotated upwardly about the operating axis Y, the pawl engagement projection 70b contacts actuating projection 58c of the release pawl 58 to rotate the release pawl 58 against the biasing force of the release pawl spring 66. This pivotal movement of the release pawl 58 causes the first stop tooth 58a to move out of engagement from the corresponding one of the positioning teeth 54c of the ratchet member 54 and the second stop tooth 58b to move into engagement with an adjacent one of the positioning teeth 54c. The shift wire take-up element 44 and the ratchet member 54 then rotate in the second rotational direction R2 by the main spring 62 until the second stop tooth 58b of the release pawl 58 catches one of the positioning teeth 54c of the ratchet member 54. In other words, the second stop tooth 58b move into engagement with an adjacent one of the positioning teeth 54c to limit rotation of the ratchet member 54 in the second rotational direction R2 so that the shift wire take-up element 44 and the ratchet member 54 only rotate for one shift position under the biasing force of the main spring 62.

Figure 18:
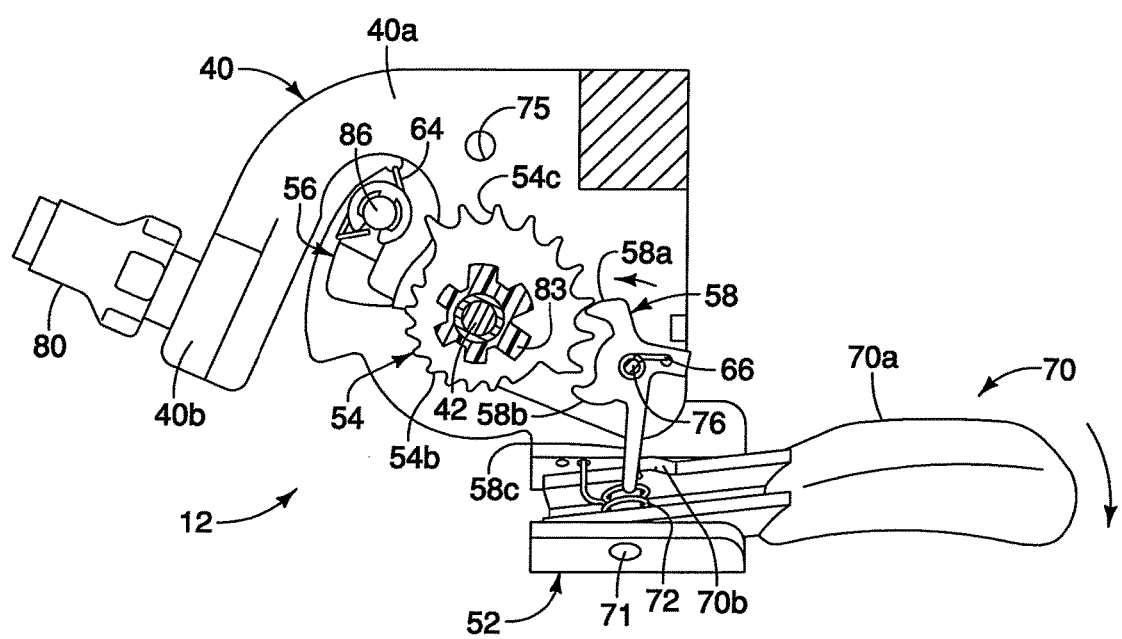
FIG. 18 is a cross sectional view, similar to FIGS. 16 and 17, of the right shift operating device, but with the shift operating member in a process of returning to the rest position after performing the shifting operation, i.e., a wire releasing operation.
Figure 19:
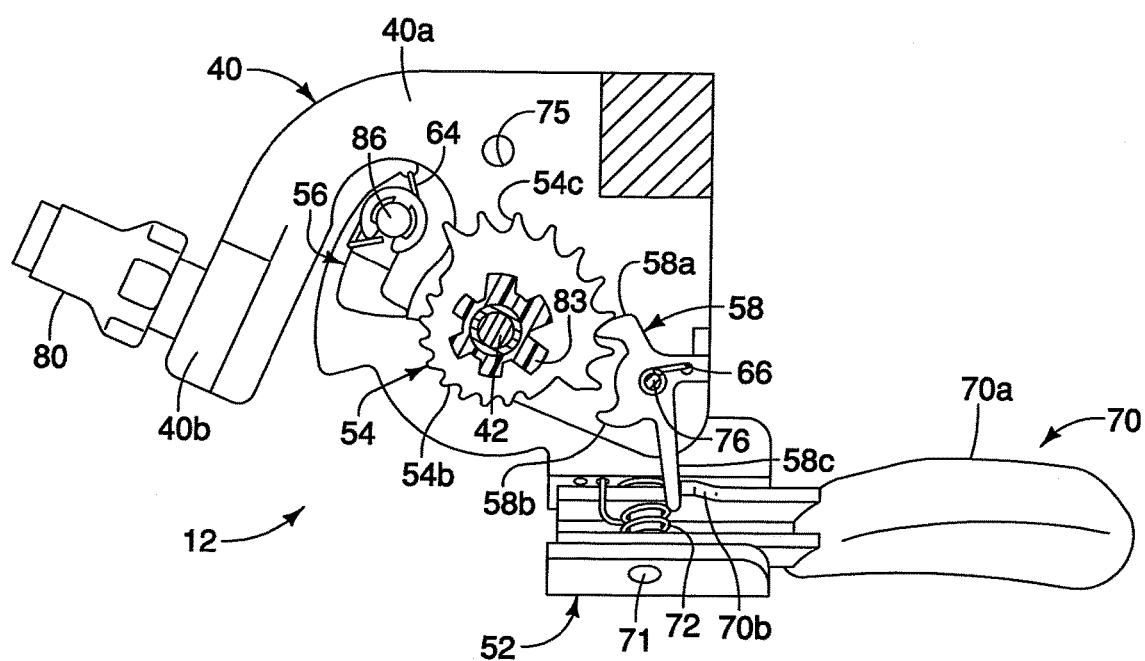
FIG. 19 is a cross sectional view, similar to FIGS. 16 to 18, of the right shift operating device, but with the shift operating member returned to the rest position after performing the shifting operation, i.e., the wire releasing operation.

In this manner, the lever member 70 of the shift operating member 52 is movably mounted with respect to the base member 40 along the second plane P2 to operate the shift wire take-up element 44 in the second rotational direction R2 in response to pivotal movement of the lever member 70 of the shift operating member 52 with respect to the operating axis Y. In other words, the lever member 70 of the shift operating member 52 pivots upwardly from the rest position with respect to the base member 40 to perform a shifting (wire releasing) operation. The lever member 70 returns to its rest position under the urging force of the spring 72 as seen in FIGS. 18 and 19.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift operating device comprising:
   a base member;
   a handlebar mounting member fixed to the base member;
   a shift wire take-up element rotatably mounted with respect to the base member in first and second rotational directions about a pivot axis; and
   a shifting unit operatively coupled to the shift wire take-up element, the shifting unit including a support member and a shift operating member movably mounted with respect to the base member to move from a rest position to a first operated position along a first plane to operate the shift wire take-up element in the first rotational direction, and the shift operating member being pivotally mounted to the support member to move relative to the support member along a second plane from the rest position to a second operated position to operate the shift wire take-up element in the second rotational direction, the first and second planes intersecting by an angle between twenty degrees and seventy degrees, the second plane intersecting the pivot axis only between the first plane and a third plane parallel to the first plane and including a handlebar mounting axis.

2. The bicycle shift operating device according to claim 1, wherein
   the angle between the first and second planes is forty-five degrees.

3. The bicycle shift operating device according to claim 1, wherein
   the shift operating member is pivotally mounted about the pivot axis of the shift wire take-up element to operate the shift wire take-up element in the first rotational direction.

4. The bicycle shift operating device according to claim 1, wherein
   the shift operating member is pivotally mounted about a secondary operating axis to operate the shift wire take-up element in the second rotational direction.

5. The bicycle shift operating device according to claim 1, wherein
   the shifting unit further includes a biasing element urging the shift wire take-up element about the pivot axis in the second rotational direction.

6. The bicycle shift operating device according to claim 1, wherein
   the shift operating member is a trigger action lever that is biased to the rest position after performing a shifting operation.

7. The bicycle shift operating device according to claim 1, wherein
   the shifting unit further includes a ratchet member mounted to rotate with the shift wire take-up element in response to movement of the shift operating member, a winding pawl operatively coupled to the shift operating member to selectively engage the ratchet member to rotate the shift wire take-up element in the first rotational direction in response to the shift operating member being moved along the first plane; and a release pawl operatively coupled to the shift operating member to release the shift wire take-up element in the second rotational direction in response to the shift operating member being moved along the second plane.

8. The bicycle shift operating device according to claim 7, wherein the release pawl is biased to engage one of a plurality of positioning teeth of the ratchet member when the shift operating member is in the rest position.

9. The bicycle shift operating device according to claim 7, wherein the release pawl engages the ratchet member such that the shift wire take-up element is released in the second rotational direction.

10. A bicycle shift operating device comprising:

a base member;

a handlebar mounting member fixed to the base member;

a shift wire take-up element rotatably mounted with respect to the base member in first and second rotational directions about a pivot axis; and a shifting unit operatively coupled to the shift wire take-up element, the shifting unit including a support member and a shift operating member movably mounted with respect to the base member to move from a rest position to a first operated position along a first plane to operate the shift wire take-up element in the first rotational direction, and the shift operating member being pivotally mounted to the support member to move relative to the support member along a second plane from the rest position to a second operated position to operate the shift wire take-up element in the second rotational direction, the first and second planes intersecting by an angle between twenty degrees and seventy degrees, the second plane intersecting the pivot axis only between the first plane and a third plane parallel to the first plane and including a handlebar mounting axis, the shifting unit further including a ratchet member mounted to rotate with the shift wire take-up element in response to movement of the shift operating member, a winding pawl operatively coupled to the shift operating member to selectively engage the ratchet member to rotate the shift wire take-up element in the first rotational direction in response to the shift operating member being moved along the first plane; and a release pawl operatively coupled to the shift operating member to release the shift wire take-up element in the second rotational direction in response to the shift operating member being moved along the second plane, the release pawl being pivotally mounted on a pivot pin having a release pawl pivot axis that extends parallel to the pivot axis about which the shift wire take-up element is rotatably mounted.

11. A bicycle shift operating device comprising:

a base member;

a handlebar mounting member fixed to the base member;

a shift wire take-up element rotatably mounted with respect to the base member in first and second rotational directions about a pivot axis; and a shifting unit operatively coupled to the shift wire take-up element, the shifting unit including a support member and a shift operating member movably mounted with respect to the base member to move from a rest position to a first operated position along a first plane to operate the shift wire take-up element in the first rotational direction, and the shift operating member being pivotally mounted to the support member to move relative to the support member along a second plane from the rest position to a second operated position to operate the shift wire take-up element in the second rotational direction, the first and second planes intersecting by an angle between twenty degrees and seventy degrees, the second plane intersecting the pivot axis only between the first plane and a third plane parallel to the first plane and including a handlebar mounting axis, the shifting unit further including a ratchet member mounted to rotate with the shift wire take-up element in response to movement of the shift operating member, a winding pawl operatively coupled to the shift operating member to selectively engage the ratchet member to rotate the shift wire take-up element in the first rotational direction in response to the shift operating member being moved along the first plane; and a release pawl operatively coupled to the shift operating member to release the shift wire take-up element in the second rotational direction in response to the shift operating member being moved along the second plane, the release pawl including a first stop tooth and a second stop tooth.

12. The bicycle shift operating device according to claim 11, wherein the first and second stop teeth alternately engage the ratchet member.

13. The bicycle shift operating device according to claim 11, wherein the first stop tooth engages the ratchet member to maintain a position of the shift wire take-up element, and the second stop tooth engages the ratchet member to release the shift wire take-up element in the second rotational direction.

14. The bicycle shift operating device according to claim 11, wherein the second plane extends between the handlebar mounting member and the first plane when viewed along a handlebar mounting axis of the handlebar mounting member.

* * * * *